(12) United States Patent
Xu

(10) Patent No.: US 12,360,772 B2
(45) Date of Patent: Jul. 15, 2025

(54) SUPERSCALAR DELAY OPTIMIZATION WITH DIVIDED ISSUE QUEUE

(71) Applicant: Xiuquan Xu, Anhui (CN)

(72) Inventor: Xiuquan Xu, Anhui (CN)

( * ) Notice: Subject to any disclaimer, the term of this patent is extended or adjusted under 35 U.S.C. 154(b) by 24 days.

(21) Appl. No.: 18/351,765

(22) Filed: Jul. 13, 2023

(65) Prior Publication Data

US 2024/0378059 A1    Nov. 14, 2024

(30) Foreign Application Priority Data

May 10, 2023   (CN) .......................... 202310518512.6

(51) Int. Cl.
   *G06F 9/38*         (2018.01)
(52) U.S. Cl.
   CPC ................................. *G06F 9/3836* (2013.01)

(58) Field of Classification Search
   CPC .............................. G06F 9/3836; G06F 9/3838
   See application file for complete search history.

(56) References Cited

U.S. PATENT DOCUMENTS

2003/0191925  A1*  10/2003  Ernst .................... G06F 9/3836
                                                              712/217
2016/0259648  A1*   9/2016  Di ........................ G06F 9/3836

OTHER PUBLICATIONS

Abella et al., "Power- and Complexity-Aware Issue Queue Designs", IEEE Micro (vol. 23, Issue 5, Sep.-Oct. 2003), pp. 50-58.*

* cited by examiner

*Primary Examiner* — David J. Huisman

(57) ABSTRACT

Superscalar Delay Optimization with Divided Issue Queue, wherein an issue queue is divided into three types, namely, ready queue, wait 1 queue, and wait 2 queue; a length of each type of queue is one-third of a length of the issue queue, so that the delay of scanning the entire issue queue from beginning to end per clock cycle is reduced to one-third.

4 Claims, No Drawings

SUPERSCALAR DELAY OPTIMIZATION WITH DIVIDED ISSUE QUEUE

1. TECHNICAL FIELD

The invention relates to the field of superscalar technology, in particular to a method for superscalar delay optimization.

2. BACKGROUND ART

In the superscalar technology issue queue, each issue needs to scan the issue queue from the beginning to the end to find out the commands that have been prepared for issue. And when the issue queue is long, especially the CIQ (centralized issue queue), it is necessary to select several commands that can be executed from a queue including a huge number of commands, and the delay will be very large, so that the cycle time is greatly affected, thereby greatly reducing the clock frequency and execution efficiency of the processor. And its delay is proportional to the capacity of the issue queue, the more commands that can be accommodated in the issue queue, the greater the delay.

In traditional superscalar techniques, scanning from beginning to end, looking for the commands that need to be issued may require O (n) time complexity at worst. Therefore, a wake up can only occur after O (n) time in one cycle.

3. SUMMARY OF THE INVENTION

The technical problem to be solved by the invention is to reduce the delay of scanning the entire issue queue from the beginning to the end per clock cycle of the traditional superscalar technology to one-third of the original one.

In order to solve the above technical problems, the technical solutions provided by the invention are: a method for superscalar delay optimization, wherein an issue queue is divided into three types, namely, ready queue, wait 1 queue, and wait 2 queue; the length of each type of queue is one-third of the issue queue, so that the delay of scanning the entire issue queue from beginning to end per clock cycle is reduced to one-third of the original; in the issue queue, the details are:
  1) ready queue: the data of both source registers is ready and can be issued directly;
  2) wait 1 queue: the data of only one source register is not ready;
  3) wait 2 queue: the data of both source registers is not ready;
  in the issue queue, the three queues include three command entry and exit modes, specifically:
  1) the positions of issue width in the front of ready queue are used as the issue ports, and the commands are sent to the execution unit;
  2) scan wait 1 queue; if allow 1 is 1, then wait 1 queue is allowed to issue; there are commands in wait 1 queue that both source registers are ready, and the issue enters ready queue;
  3) scan wait 2 queue; if allow 2 is 1, then wait 2 queue is allowed to issue; there are commands in wait 2 queue that one source register is ready or both source registers are ready, and the issue enters wait 1 queue.

The advantages of the invention compared with prior art are: in the invention, an issue queue is divided into three types, namely, ready queue, wait 1 queue, and wait 2 queue; the length of each type of queue is one-third of the issue queue, so that the delay of scanning the entire issue queue from beginning to end per clock cycle is reduced to one-third of the original. Further, the three command entry and exit modes are parallel.

Further, the positions of issue width in the front of ready queue are set as the issue ports, the first position is the issue port for issuing the first issue queue command, and the second position is the issue port for issuing the second issue queue command, and so on to the issue width position, so that it is possible to find the commands that need to be issued and executed from the issue queue in a time complexity of O (1) in one cycle, that is, it can be woken up after a very small constant time complexity.

Further, in the issue queue, the three command entry and exit modes are applicable to any command type, but it needs to meet the condition that one command has at most two source registers and one destination register (applicable to risc instruction type, arm instruction type, micro instruction type that meets the condition, and any other instruction type that meets the condition).

4. SPECIFIC EMBODIMENT OF THE INVENTION

When the invention is in specific implementation, several important parameters are included:
  1) machine width: the length of the machine queue, that is, the maximum number of commands that the processor can decode and rename at one time;
  2) issue width: the number of commands that can be issued and executed from the issue queue at most once per cycle.

The type of queue storage command in this solution: any command type, but it needs to meet the condition that one command has at most two source registers and one destination register (applicable to risc instruction type, arm instruction type, micro instruction type that meets the condition, and any other instruction type that meets the condition).

In one embodiment of the invention, the core principle of this solution is: an issue queue is divided into three types, namely, ready queue, wait 1 queue, and wait 2 queue; the length of each type of queue is one-third of the issue queue, so that the delay of scanning the entire issue queue from beginning to end per clock cycle is reduced to one-third of the original.

In detail, the issue queue includes:
  1) ready queue: the data of both source registers is ready and can be issued directly;
  2) wait 1 queue: the data of only one source register is not ready;
  3) wait 2 queue: the data of both source registers is not ready;

In one embodiment of the invention, in the issue queue, the three queues include three command entry and exit modes, specifically:
  1) the positions of issue width in the front of ready queue are used as the issue ports, and the commands are sent to the execution unit;
  2) scan wait 1 queue; if allow 1 is 1, then wait 1 queue is allowed to issue; there are commands in wait 1 queue that both source registers are ready, and the issue enters ready queue;
  3) scan wait 2 queue; if allow 2 is 1, then wait 2 queue is allowed to issue; there are commands in wait 2 queue that one source register is ready or both source registers are ready, and the issue enters wait 1 queue.

The above three processes are parallel, thus reducing the scan queue delay to ⅓ of the original.

In one embodiment of the invention, the working principle of the solution is: the positions of issue width in the front of ready queue are set as the issue ports, the first position is the issue port for issuing the first issue queue command, and the second position is the issue port for issuing the second issue queue command, and so on to the issue width position, so that it is possible to find the commands that need to be issued and executed from the issue queue in a time complexity of O (1) in one cycle, that is, it can be woken up after a very small constant time complexity.

The invention and the embodiments thereof are described hereinabove, and this description is not restrictive. All in all, structural methods and embodiments similar to the technical solution without deviating from the purpose of the invention made by those of ordinary skill in the art without creative design shall all fall within the protection scope of the invention. The protection scope of the invention is defined by the appended claims and the equivalents thereof.

The invention claimed is:

1. A method for superscalar delay optimization to reduce delay associated with scanning an issue queue from beginning to end, the method comprising:
dividing the issue queue into three queues, the three queues comprising a ready queue, a wait 1 queue, and a wait 2 queue, wherein a length of each of the three queues is one-third of a length of the issue queue, wherein:
for each instruction in the ready queue, data of both source registers is ready and can be issued directly;
for each instruction sent to the wait 1 queue, data of only one source register is not ready; and
for each instruction sent to the wait 2 queue, data of both source registers is not ready; and
operating in three command entry and exit modes, the operating comprising:
in a first mode, sending instructions from the front of the ready queue to an execution unit;
in a second mode, when allow 1 is 1, sending instructions having both source registers ready from the wait 1 queue to the ready queue; and
in a third mode, when allow 2 is 1, sending instructions having at least one source register ready from the wait 2 queue to the wait 1 queue.

2. The method for superscalar delay optimization of claim 1, wherein the three command entry and exit modes are parallel.

3. The method for superscalar delay optimization of claim 1,
further comprising:
issuing a first issue queue instruction from the ready queue using a first issue port; and
issuing a second issue queue instruction from the ready queue using a second issue port.

4. The method for superscalar delay optimization of claim 1, wherein the three command entry and exit modes are applicable to any instruction that has two source registers and one destination register.

* * * * *